Patented Jan. 11, 1949

2,459,076

UNITED STATES PATENT OFFICE 2,459,076

PROCESS OF PREPARING 1,1,3,3-TETRAALKOXYPROPANES

Martin E. Hultquist, Bound Brook, N. J., assignor to American Cyanamid Company, New York, N. Y., a corporation of Maine No Drawing. Application March 11, 1948, Serial No. 14,382

5 Claims. (Cl. 260—615)

This invention relates to a process of preparing 1,1,3,3-tetraalkoxypropanes.

Tetraalkoxypropanes are valuable as intermediates for the preparation of 2-aminopyrimidine by reaction with guanidine or its salts. The compounds have the following general formula:

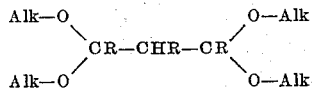

in which R is hydrogen or alkyl, aryl or aralkyl hydrogen alkyl aryl, aralkyl halogen and the like.

Tetraalkoxypropanes have been prepared by reacting vinyl ethers with esters of formic acid. The reaction may be considered as a straight addition reaction at the double bond of the vinyl ether. According to the present invention, I have found that it is possible to react with orthoesters a class of vinyl compounds which cannot form tetraalkoxypropanes by straight addition at the double bond. These are the vinyl esters such as vinyl acetate, vinyl propionate, vinyl esters, vinyl butyrate and the like. The vinyl group may be substituted on the α or β carbon atom. The ester group is replaced but surprisingly hydrolysis or alcoholysis takes place. Typical esters are 2 propenyl acetate or propionate. Just how the reaction proceeds is not completely known nor is any explanation at present available of how the stable ester group is decomposed in the reaction. Accordingly, it is not desired to limit the present invention to any theory of action. For best results two or more stoichiometrical equivalent of the ortho-ester are needed. This is further proof that the reaction of the present invention is entirely different from that involved in the addition reaction with vinyl esters. It is an advantage of the present invention that the cheaper, commercially available vinyl esters which are produced in enormous quantities for the plastic and synthetic fiber industries can be used instead of the less available vinyl ethers and that in spite of the fact that the compounds cannot add to an orthoformate to produce a tetraalkoxypropane the reaction proceeds smoothly and with satisfactory yields.

The invention is not limited to the use of any particular ortho-esters or to any particular vinyl esters. When ethyl orthoformate and vinyl acetate are reacted, a 1,1,3,3-tetraethyoxypropane is produced. Substitution of methyl orthoformate will produce a 1,1,3,3-tetramethoxypropane.

A tetraalkoxymethylpropane can be produced from the corresponding esters of ortho acetic acid with vinyl acetate or from orthoformates and alpha methyl vinyl esters. 1,3-dimethyl propanes can be produced from ortho-acetates and alpha methyl vinyl esters. Tetraalkoxy 2 halogen propanes can be obtained from halogen substituted vinyl esters. The nature of the acid in the vinyl ester is not important as this group does not enter into the final product. The cheaper acetates are therefore preferred.

The reaction of the present invention proceeds more readily in the presence of an acid reacting halide catalyst. Examples of such catalysts are: aluminum chloride, iodine, mercuric chloride, chloride, ferric chloride, and boron trifluoride, zinc chloride, stannous chloride. As is usual with catalysts, the catalyst is not present in the final product and merely aids and accelerates the reaction.

The invention will be described in greater detail in conjunction with the following specific examples. Parts are by weight.

Example 1

72 parts of ethyl orthoformate, 43 parts of vinyl acetate and 0.1 anhydrous ferric chloride are measured and a solution heated to about 80° C. Reaction starts and as it is exothermic the temperature is maintained by refluxing. After reaction has slowed down, the mixture is allowed to stand and is then distilled under reduced pressure. 1,1,3,3-tetraethoxypropane is obtained as a fraction boiling at 85–87° C. at 6–7 mm.

The tetraalkoxypropane has the property when boiled with aqueous ferric chloride of giving a purple color.

Example 2

The process of Example 1 is followed, substituting aluminum chloride for the ferric chloride. The tetraethoxypropane is produced as in Example 1 and gives the same color test when boiled with aqueous ferric chloride.

Example 3

The procedure of Example 1 is followed, substituting stannous chloride for the ferric chloride. The reaction proceeds in the same way and a tetraethoxypropane is obtained which on boiling with aqueous ferric chloride gives the same typical purple color.

Example 4

The procedure of Example 1 is followed, using stannic chloride instead of ferric chloride. The reaction proceeds in the same way and a tetraethoxypropane is obtained which gives a color test with aqueous ferric chloride.

Example 5

The procedure of Example 1 is followed, substituting mercuric chloride for ferric chloride. The same tetraethoxypropane is obtained and it gives the same purple color when boiled with aqueous ferric chloride.

When boron trifluoride is used in place of mercuric chloride, the reaction does not proceed as completely and while the tetraethoxypropane is obtained, the yields are comparatively low.

Example 6

A mixture of 106 parts trimethyl orthoformate, 86 parts vinyl acetate, and 2 parts anhydrous ferric chloride, is warmed to 60°. On standing, the mixture warms up from the heat of reaction to 70–80°. After about 2 hours the mixture is cooled, washed with ice water, and dried over potassium carbonate. On distillation there is obtained 1,1,3,3-tetramethoxypropane boiling at 70–75° at 15 mm. pressure.

Example 7

To a mixture of 21.5 parts vinyl acetate and 111 parts triethylorthoformate is added gradually over 3 hours 1.3 parts anhydrous ferric chloride and 2 parts acetic anhydride, while maintaining the temperature of the reaction mixture at 70–90° C.

After cooling, the reaction mixture is washed with ice water, then with ice water containing a little ammonia, and the water insoluble layer is dried over anhydrous sodium sulfate. There is obtained on distillation under reduced pressure, after removal of unreacted triethyl orthoformate and other low-boiling fractions, 1,1,3,3-tetraethoxypropane boiling at 85–87° at 7–8 mm.

It will be noted that even with the large excess of triethyl orthoformate, the reaction proceeds satisfactorily.

Example 8

To a mixture of 74 parts ethyl orthoformate and 43 parts vinyl acetate is added 2 parts anhydrous zinc chloride. The mixture is allowed to stand about 72 hours at 20–30° C. After washing the resulting solution with ice water and finally drying over potassium carbonate, the 1,1,3,3-tetraethoxypropane is obtained by distillation under reduced pressure boiling at 83–85° at 6–7 mm.

Example 9

A mixture of 67 parts vinyl butyrate and 72 parts triethylorthoformate is heated to 60° C., and 0.2 g. anhydrous ferric chloride is added. The reaction mixture is warmed to 80–85° for 2 hours. On distillation under reduced pressure, there is obtained 1,1,3,3-tetraethoxypropane boiling at 85–87° at 7–8 mm.

I claim:

1. A method of preparing 1,1,3,3-tetraalkoxypropanes which comprises reacting an ester of orthoformic acid with a vinyl ester in the presence of an acid-reacting halide catalyst.

2. A method according to claim 1 in which the catalyst is a metal halide.

3. A method according to claim 2 in which the catalyst is ferric chloride.

4. A method according to claim 1 in which the alkyl orthoformate is triethyl orthoformate, and the vinyl ester is vinyl acetate.

5. A method according to claim 4 in which the catalyst is ferric chloride.

MARTIN E. HULTQUIST.

REFERENCES CITED

The following references are of record in the file of this patent:

UNITED STATES PATENTS

| Number | Name | Date |
|---|---|---|
| 2,229,651 | Hanford et al. | Jan. 28, 1941 |
| 2,425,042 | McNamee et al. | Aug. 5, 1947 |